(12) United States Patent
Hayashi et al.

(10) Patent No.: US 6,595,274 B2
(45) Date of Patent: Jul. 22, 2003

(54) EXHAUST GAS HEAT EXCHANGER

(75) Inventors: Takayuki Hayashi, Aichi-gun (JP); Akihiro Maeda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/202,438

(22) Filed: Jul. 24, 2002

(65) Prior Publication Data

US 2003/0019616 A1 Jan. 30, 2003

(30) Foreign Application Priority Data

Jul. 26, 2001 (JP) .................................... 2001-226409

(51) Int. Cl.[7] .................................................. F28F 9/02
(52) U.S. Cl. ................... 165/158; 165/52; 123/568.12; 60/320
(58) Field of Search .............. 165/52, 158; 123/568.12, 123/568.17; 60/320

(56) References Cited

U.S. PATENT DOCUMENTS 6,247,523 B1 * 6/2001 Shibagaki et al. ............ 165/51
6,390,186 B1 * 5/2002 Laudic et al. ................ 165/158
2001/0047861 A1 * 12/2001 Maeda et al. ................ 165/167

FOREIGN PATENT DOCUMENTS

| DE | 3212913 A1 | * 10/1983 | ............... 165/158 |
| DE | 3212914 A1 | * 10/1983 | ............... 165/158 |
| EP | 406774 A1 | * 1/1991 | ............... 165/158 |
| JP | A5-1895 | 1/1993 | |
| JP | 2001-33187 | 2/2001 | |

* cited by examiner

Primary Examiner—Henry Bennett
Assistant Examiner—Terrell McKinnon
(74) Attorney, Agent, or Firm—Harness, Dickey & Pierce, PLC

(57) ABSTRACT

An exhaust gas heat exchanger has a tank, laminated plural exhaust gas tubes disposed in the tank, a cooling water inlet pipe and a cooling water outlet pipe. The exhaust gas from a combustion engine flows into the exhaust gas tubes to exchange heat with the cooling water flowing in the tank. The core plates, which seal the tank at its both ends, are folded toward bonnets that are disposed at the both sides of the tank. The inlet pipe or the outlet pipe is disposed on the tank close to the core plate so that the cooling water can flow near the core plate in the tank so as to be prevented from being stuck near the core plate.

6 Claims, 5 Drawing Sheets

FIG. 1 <u>RELATED ART</u>
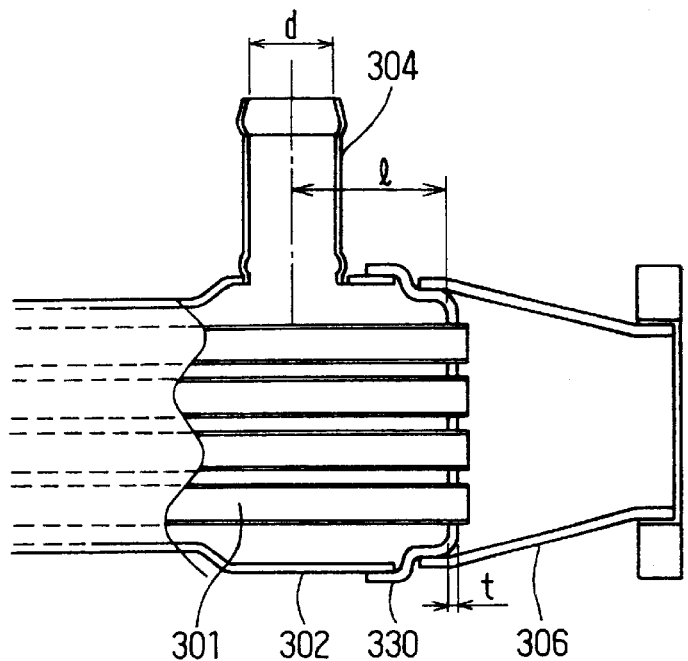
FIG. 2
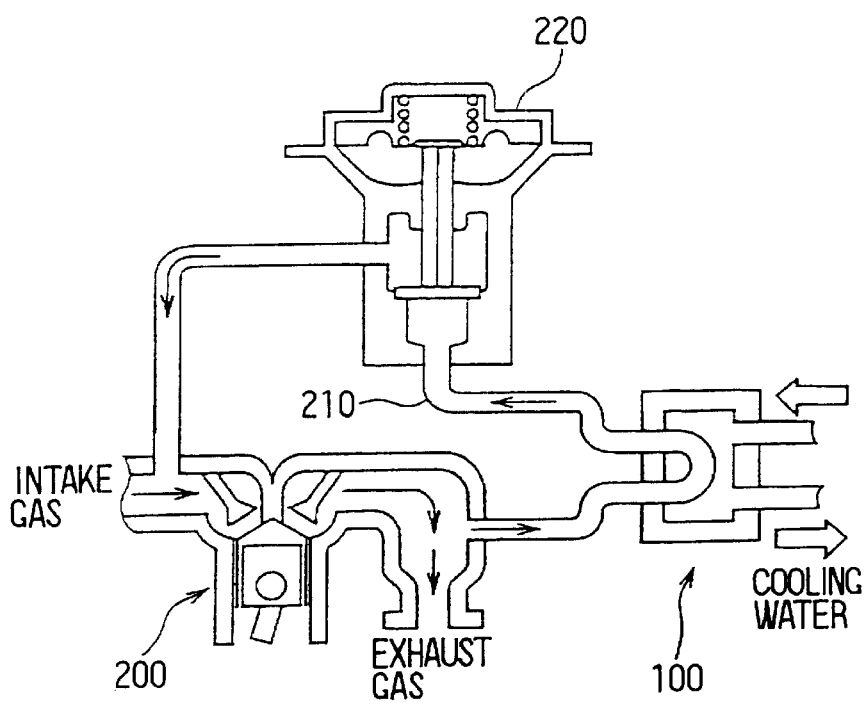

EXHAUST GAS HEAT EXCHANGER

CROSS REFERENCE TO RELATED APPLICATION

This application is based upon Japanese Patent Application No. 2001-226409, filed on Jul. 26, 2001, the contents of which are incorporated herein by reference.

BACKGROUND OF THE INVENTION

1. Field of the Invention

The present invention relates to an exhaust gas heat exchanger for performing heat exchange between exhaust gas generated by combustion and cooling water. Specifically, the present invention relates to an exhaust gas heat exchanger for cooling the exhaust gas in an exhaust gas recirculation system (i.e., EGR system).

2. Related Art

As shown in FIG. 1, an exhaust gas heat exchanger for cooling the exhaust gas in an EGR system (hereinafter, referred to as an EGR gas heat exchanger) is equipped with plural laminated exhaust gas tubes 301 disposed in a tank 302. The exhaust gas tubes 301 penetrate and are attached to a core plate 330. A peripheral portion of the core plate 330 is folded toward the tank 302, and is attached to an outer wall of the tank 302. The tank 302 is closed with the core plate 330 to isolate a cooling water passage formed in the tank 302 from a bonnet 306. A cooling water inlet pipe 304 and a cooling water outlet pipe (not shown) are disposed on the tank 302 to permit the flow of the cooling water through the tank 302.

In this EGR gas heat exchanger, an adequate contact area is necessary for ensuring contact strength between the peripheral portion of the core plate 330 and the tank 302. Therefore, when the core plate 330 is folded toward the tank 302 as shown in FIG. 1, the cooling water inlet pipe 304 must be kept away from the core plate 330, for example, the distance 1 in the figure is about 20–30 mm, to obtain the adequate contact area between the core plate 330 and the tank 302. As a result, the cooling water becomes stuck at a portion of the tank 302 between the core plate 330 and the cooling water inlet pipe 304 or between another core plate (disposed at the other side, not shown) and the cooling water outlet pipe. Accordingly, the heat exchanging efficiency would be lowered and the boiling of the cooling water may occur at the vicinity of the core plate.

SUMMARY OF THE INVENTION

An object of the present invention is to provide an exhaust gas heat exchanger in which a cooling water pipe is disposed close to a core plate to improve the heat exchanging efficiency and resistance to boiling.

The exhaust gas heat exchanger has a tank, plural exhaust gas tubes provided in the tank through which exhaust gas flows. A water passage is defined in the tank where cooling water flows from a cooling water inlet pipe to a cooling water outlet pipe. The plurality of exhaust gas tubes are connected to core plates at an upstream side thereof and a downstream side thereof. The core plates are connected to bonnets at both sides of the tank. A peripheral portion of at least one of the core plates is folded toward the bonnet to which said at least one of the core plates is connected.

With this feature, the cooling water inlet pipe, for example, can be disposed close to the core plate at the upstream side. In this case, the cooling water can flow close to the upstream side of the plural exhaust gas tubes. As a result, the cooling water can be prevented from being stuck at the upstream side of plural exhaust gas tubes.

Preferably, the at least one of the core plates is the one disposed at the upstream side of the plural exhaust gas tubes.

Preferably, the cooling water inlet pipe or the cooling water outlet pipe is disposed on the tank at a location where the disposed distance of the pipe from the core plate is equal to or less than a diameter of the pipe.

Other features and advantages of the resent invention will become more apparent from the following detailed description made with reference to the accompanying drawings.

BRIEF DESCRIPTION OF THE DRAWINGS

FIG. 1 is a partial cross sectional view showing an EGR gas heat exchanger in the related art;

FIG. 2 is a schematic view of an EGR system according to the present invention;

DETAILED DESCRIPTION OF THE PREFERRED EMBODIMENT

Figure 3A:
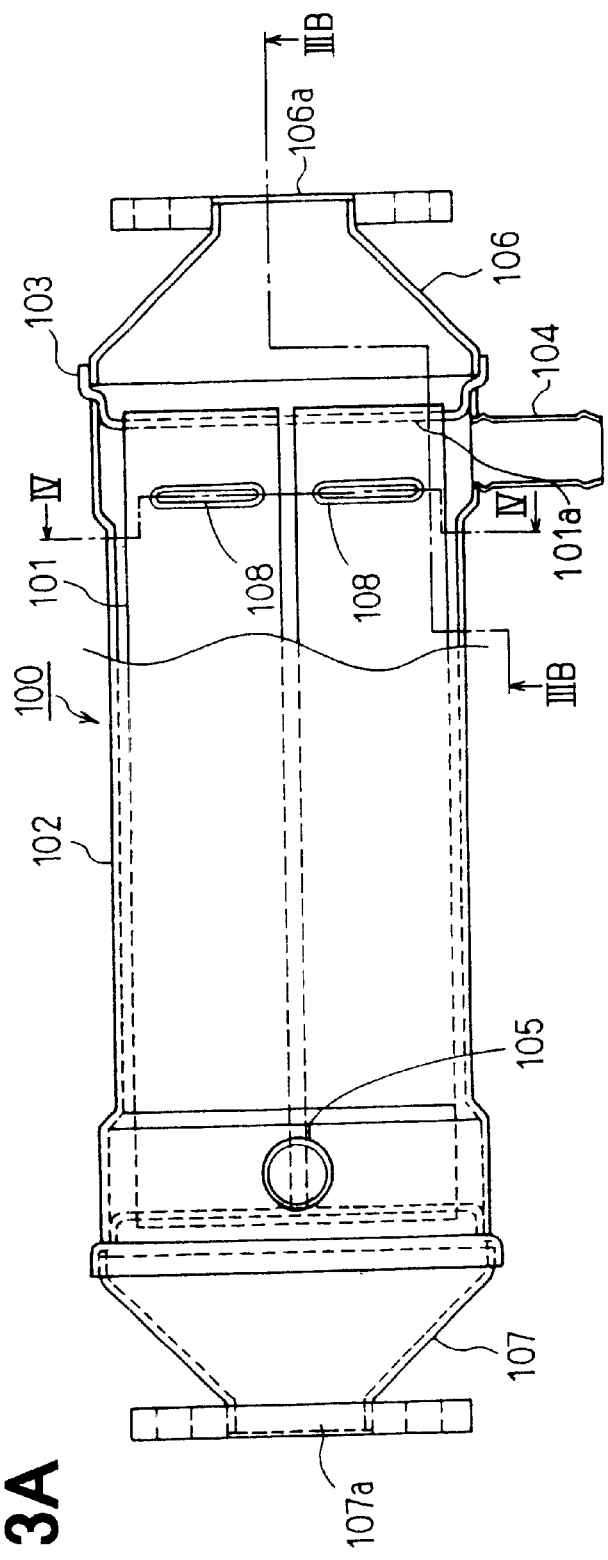
FIG. 3A is a partial cross sectional view of an EGR gas heat exchanger in a first embodiment of the present invention.

Specific embodiments of the present invention will now be described hereinafter with reference to the accompanying drawings in which the same or similar component parts are designated by the same or similar reference numerals.

A first preferred embodiment of the present invention will be now described with reference to FIGS. 2 to 8. In this embodiment, the present invention is typically applied to an EGR cooler of an exhaust gas recirculation system (EGR system) for a diesel engine 200 (internal combustion system). FIG. 2 shows an exhaust gas heat exchanger 100 (hereinafter, referred to as an EGR gas heat exchanger) of this embodiment.

The EGR system includes an exhaust gas recirculation pipe 210 through which a part of the exhaust gas discharged from the engine 200 returns to an intake side of the engine 200. An EGR valve 220 for adjusting the amount of exhaust gas recirculation in accordance with an operational state of the engine 200 is disposed in the exhaust gas recirculation pipe 210. The EGR gas heat exchanger 100 is disposed between an exhaust gas side of the engine 200 and the EGR valve 220 so that heat exchange is performed between the exhaust gas discharged from the engine 200 and cooling water (i.e., engine-cooling water).

Next, a structure of the EGR gas heat exchanger 100 will be described with reference to FIGS. 3A, 3B and 4.

Figure 4:
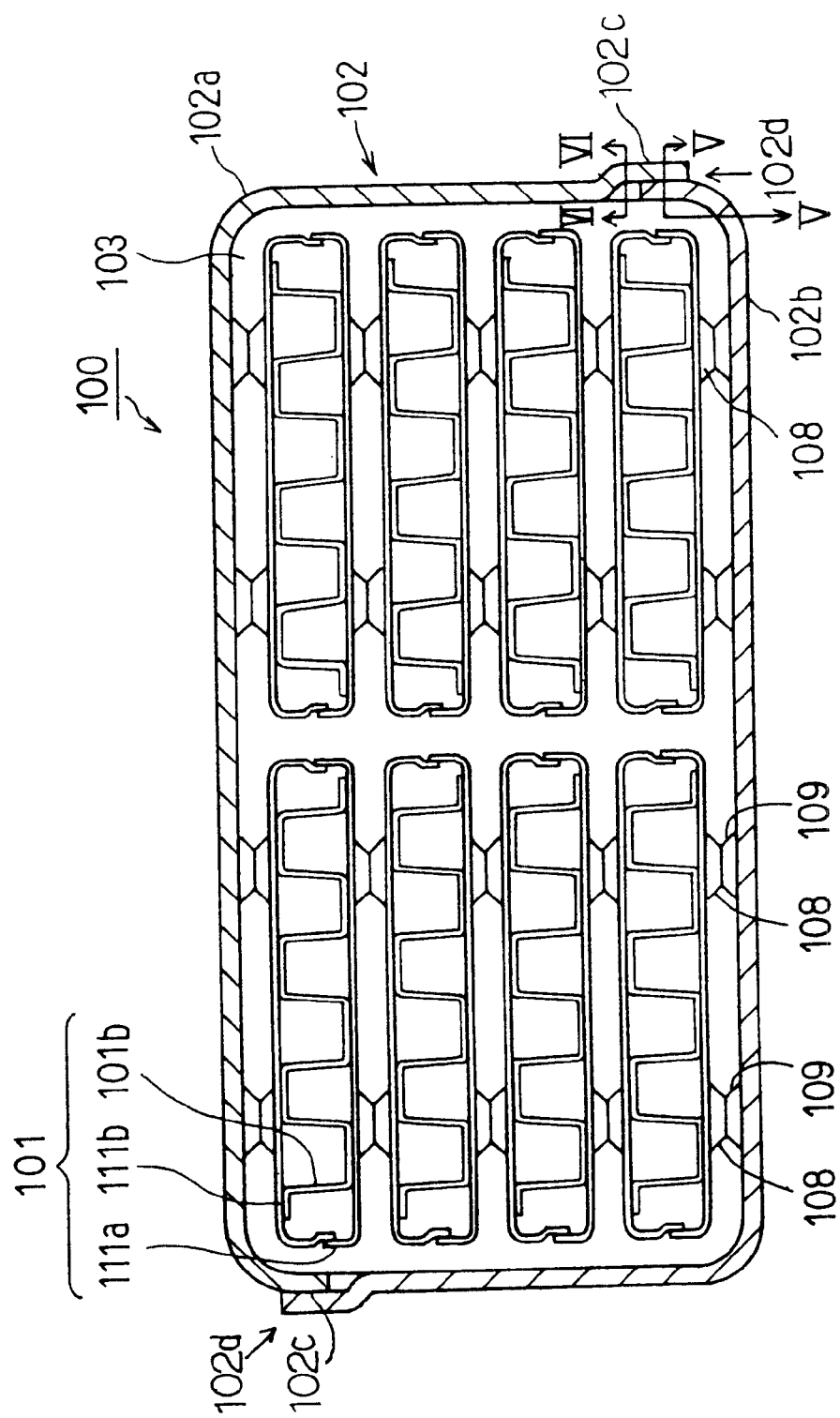
FIG. 4 is a cross sectional view of a slightly different type of the EGR gas heat exchanger in the first embodiment of the present invention showing a cross sectional view of a tank and plural exhaust gas tubes taken along line IV—IV in FIG. 3A.

EGR gas heat exchanger 100 comprises plural, in this case, four exhaust gas tubes 101 each of which has a flat rectangular cross section, and each of which is formed by joining two plates 111a and 111b and has an inner fin 101b therein, which is for partitioning the space formed in each exhaust gas tube 101 to form plural small passages by being folded many times (shown in FIG. 4 as plates 111a and 111b, and an inner fine 101b).

Ribs 108 are formed, as guides for the cooling water, on both main surfaces of each exhaust gas pipe 101 at portions of both main surfaces close to the upstream side of the exhaust gas tubes 101. Both ribs 108 formed on the exhaust gas tube 101 contact to the other ribs 108 formed on adjoining one of the exhaust gas tubes 101. The ribs 108 formed on the outer main surfaces of the outermost exhaust gas tubes 101 contact protrusions 109 formed on an inner wall of a tank 102 in the laminated direction of the exhaust gas tubes 101. The ribs 108 and protrusions 109 keep the width of each water passage, formed between adjacent exhaust gas tubes 101 and between the outermost exhaust gas tube 101 and the inner wall of the tank 102, constant.

As shown in FIG. 4, the tank 102 has a flat rectangular cross sectional shape that is formed by soldering plates 102a and 102b.

The plates 102a and 102b both have a step 102c formed at one end thereof that protrudes outward. The other flat end of the plates 102a and 102b are connected to the step 102c of the other plate 102a or 102b. The plates 102a and 102b are connected to each other by soldering at connecting portions 102d where the steps 102c are formed. The tank 102 and plural exhaust gas tubes 101 constitute a heat exchanging core 110 by accommodating the exhaust gas tubes 101 in the tank 102 so that the longitudinal direction of the exhaust gas tubes 101 coincides the longitudinal direction of the tank 102.

The tank 102 is closed by core plates 103 at both ends thereof. Each core plate 103 has openings through which the exhaust gas tubes 101 are connected to the core plates 103 by soldering.

Figure 3B:
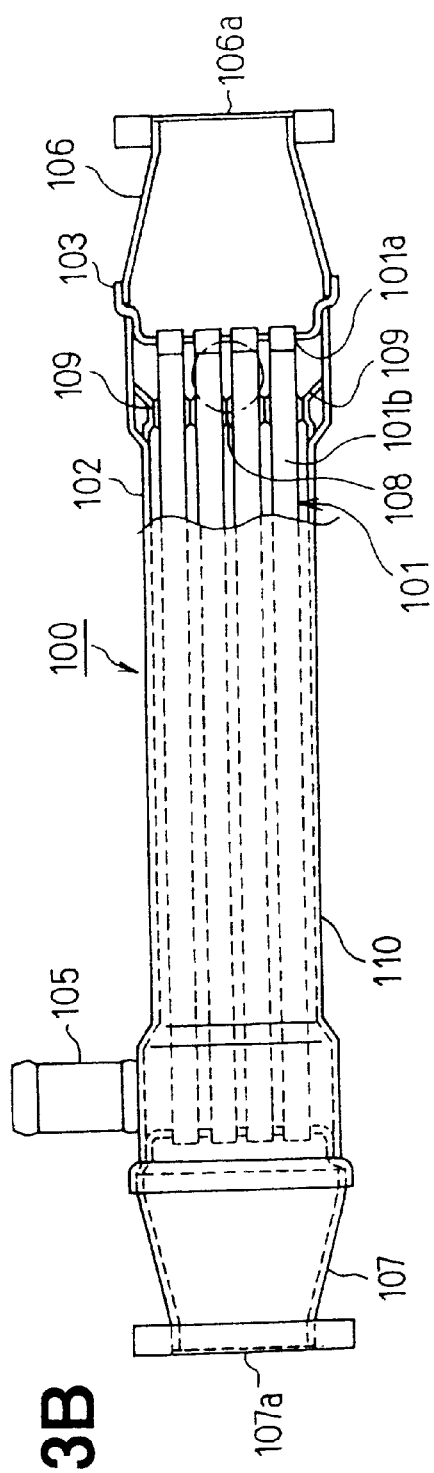
FIG. 3B is a partial cross sectional view of the EGR gas heat exchanger in the first embodiment of the present invention taken along line IIIB—IIIB in FIG. 3A.

As shown in FIG. 3A, a cooling water inlet pipe 104 is provided at one end of the tank 102 where an upstream side of exhaust gas tubes 101 is disposed so as to be disposed close to the core plate 103. The cooling water flows into the tank 102 through the cooling water inlet pipe 104. A cooling water outlet pipe 105 is connected to the other end of the tank 102 so as to be disposed close to the other core plate 103. Accordingly, the tank 102 serves as a passage for the cooling water.

The cooling water inlet pipe 104 and outlet pipe 105 are disposed away from respective core plates 103 at substantially a distance of d/2. The "l" is a distance between the respective core plates 103 at the near side and the center of the inlet pipe 104 or the center of outlet pipe 105 as shown in FIG. 1. Also, the "t" is a thickness of the core plates 103, and the "d" is a diameter of the inlet pipe 104 or outlet pipe 105, as shown in FIG. 1.

Bonnets 106, 107 are connected to both ends of the tank 102 by soldering so that edges of both core plates 103 are folded in opposite directions with regard to the heat exchanging core 110 as shown in the figures to surround end portions of both bonnets 106, 107. An exhaust gas inlet 106a is formed in the bonnet 106 disposed at a cooling water inlet pipe side for introducing the exhaust gas to the bonnet 106. An exhaust gas outlet 107a is formed in the bonnet 107 disposed at a cooling water outlet pipe side for exhausting the exhaust gas from the bonnet 106 to the outside. The cooling water flows in a direction substantially identical to the stream of the exhaust gas flowing through the exhaust gas tubes 101.

Both of the bonnets 106, 107 have a quadrangular pyramid-like shape so that the duct cross sectional area increases toward the heat exchanging core to improve the distribution of exhaust gas to each exhaust gas tube 101.

In this EGR gas heat exchanger 100 described above, the exhaust gas introduced from the exhaust gas inlet 106a passes through the bonnet 106 and each of the exhaust gas tubes 101. Then, the exhaust gas is cooled down by the cooling water flowing around each of the exhaust gas tubes 101. After that, the cooled exhaust gas is exhausted from the exhaust gas outlet 107a through the bonnet 107.

The cooling water flows into the tank 102 through the cooling water inlet pipe 104 and passes through the tank 102 to cool down the exhaust gas flowing through each exhaust gas tube 101. Finally, the cooling water flows out from the tank 102 through the cooling water outlet pipe 105.

Next, the core plates 103 will be described in detail with reference to FIGS. 5 to 8.

Figure 5:
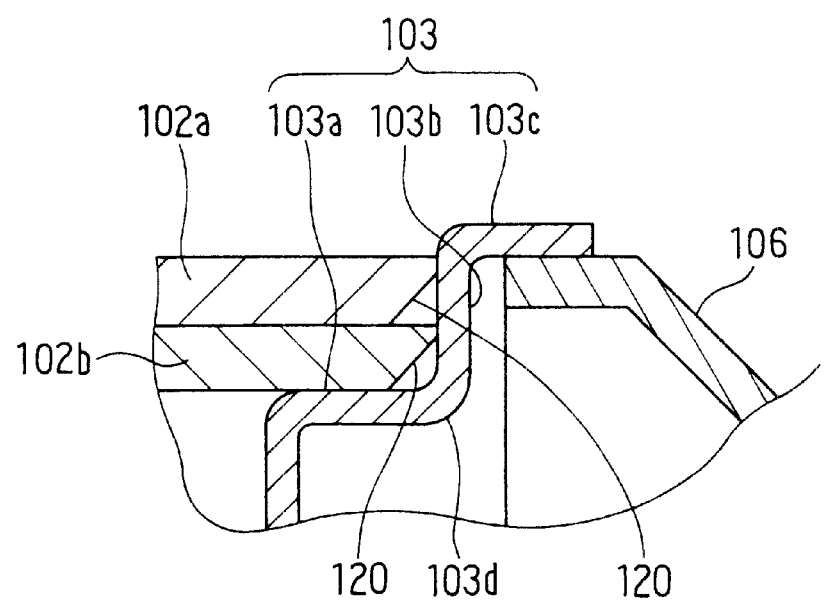
FIG. 5 is an enlarged cross sectional view of the EGR gas heat exchanger in the first embodiment of the present invention taken along line V—V in FIG. 4.

As shown in FIG. 5, the peripheral portion of each core plate 103 is folded toward the respective bonnets 106 and 107 to form a crank shape in cross sectional view. The peripheral portion of each core plate 103 has a first perpendicular wall 103a, a flat portion 103b and a second perpendicular wall 103c in order from a root portion of the plate 103 where the exhaust gas tubes 101 are connected to the end of the plate 103. The first perpendicular wall 103a contacts the inner wall of the tank 102 as a connecting portion to the tank 102. The plates 102a and 102b of the tank contact the flat portion 103b contiguous from the wall 103a. The second perpendicular wall 103c, which is an outermost end portion, contacts an outer wall of the bonnet 106 or 107 as a connecting portion thereto. The end portions of plates 102a and 102b, which contact the flat portion 103b, are deformed to have tapered portions 120 so that that they do not interfere with the folded radius R of a folded portion 103d between the first wall 103a and the flat portion 103b. The tapered angle of the tapered portion 120 is mainly determined to satisfy the above-described condition.

Next, the manufacturing method of the EGR gas heat exchanger will be described.

The first and second plates 111a and 111b fit with each other with the inner fine 101b interposed therebetween to form the tube 101. The tubes 101 are laminated so that the ribs 108 formed on adjacent tubes 101 contact each other. After that, the laminated tubes 101 are encapsulated in the tank 102 by fitting the plates 102a and 102b with each other. The plates 102a and 102b are connected with each other at two connecting portions 102d where steps 102c are formed so that one end of the plate 102a is laid on one end of the plate 102b at one connecting portion 102d and the other end of the plate 102b is laid on the other end of the plate 102a at the other connecting portion 102d as shown in FIG. 4. The ribs 109 are formed on the inner wall of the tank 102. The ribs 109 contact the ribs 108 formed on the outermost tubes 101. The core plates 103 are assembled to the tank 102 to seal the tank so that both ends of the tubes 101 are inserted through the openings formed in the core plates 103 and fixed to the core plates 103. Moreover, the core plates 103 are assembled to the tank 102 so that the first perpendicular wall 103a contacts the inner wall of the tank 102 and the flat portion 103b contacts the ends of plates 102a and 102b. Consequently, bonnets 106 and 107 are assembled to the tank 102 so that the second perpendicular wall 103c of the core plate 103 contacts the outer wall of the bonnet 106 or 107. Also, the cooling water inlet pipe 104 and outlet pipe 105 are assembled on the tank 102. After each part is assembled as described above, soldering is performed to obtain the EGR gas heat exchanger 100.

In this embodiment, the cooling water inlet pipe 104 and outlet pipe 105 are disposed on the tank 102 at the locations close to the respective core plates 103 since the core plates 103 are folded toward the respective bonnets 106 and 107. Moreover, the core plates 103 have the connecting portions 103a to be connected to the inner wall of the tank 102 by soldering. Therefore, the connecting portions are secured between the core plates 103 and the tank 102. In this embodiment, the cooling water can flow into the tank 102 along the core plate 103 at a side of the bonnet 106, or the cooling water can flow out from the tank 103 along the core plate 103 at a side of the bonnet 107. Therefore, the cooling water is prevented from being stuck in the tank 102. As a result, the cooling water that does not contribute to heat exchanging with the exhaust gas can be reduced, thereby improving the heat exchanging efficiency.

Since the temperature of the exhaust gas is relatively high at the upstream side of the exhaust gas tubes 101, the cooling water might be boiled easily if the cooling water was stuck at the upstream side of the exhaust gas tubes 101, i.e., at a side of the cooling water inlet pipe 104. However, in this embodiment, the cooling water inlet pipe 104 can be disposed on the tank 102 close to the core plate 103, so that the cooling water is prevented from being stuck at the upstream side of the exhaust gas tubes 101 to restrain the boiling of the cooling water.

The peripheral portion of each core plate 103 is formed using a press process to have the first wall 103a and second wall 103c both of which extend in a direction perpendicular to the root portion 101a of the tubes 101 and the flat portion 103b. It is difficult to make a folded portion 103d formed between the first wall 103a and the flat portion 103b so as to have right angle at its corner point. Therefore, the folded portion 103d is rounded as shown in FIGS. 5 to 8.

Figure 7:
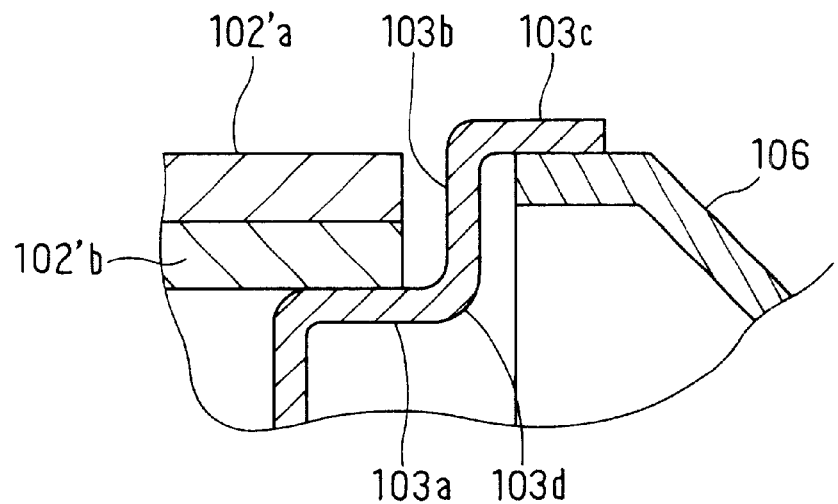
FIG. 7 is an enlarged cross sectional view similar to FIG. 5 of the EGR gas heat exchanger in the first embodiment.

In this situation, as shown in FIG. 7, if a tip portion of the plate 102'b at the one connecting portion 102d (or a tip portion of the plate 102'a at the other connecting portion 102d) is flat, the tip portion might not contact the flat portion 103b because the rounded folded portion 103d prevents the tip portion from contacting the flat portion 103b when the first wall 103a is connected to the inner wall of the tank 102, i.e., the plate 102'b (102'a). As a result, the gap may be formed between the tip portion of the plate 102'b (102'a) and the flat portion 103b. However, as shown in FIG. 5, when the tip portion of the plate 102b (102a) in this figure is formed to have the tapered portion 120, the tip portion of the plate 102b (102a) does not interfere with the folded portion 103d. Accordingly, even if the folded portion 103d is formed to have a curve portion, the tip portion of the plate 102b (102a) can contact the flat portion 103b easily while the first wall 103a contacts the inner wall of the tank 102. As a result, the core plate 103 is fixed to the tank 102 by soldering efficiently.

Figure 6:
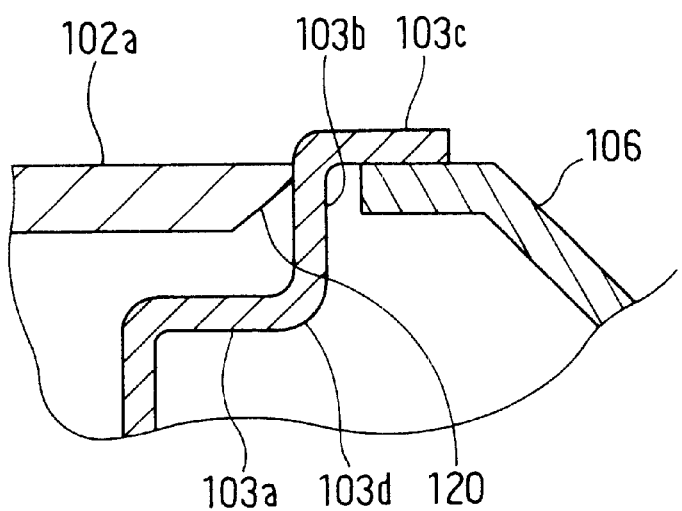
FIG. 6 is an enlarged cross sectional view of the EGR gas heat exchanger in the first embodiment of the present invention taken along line VI—VI in FIG. 4.
Figure 8:
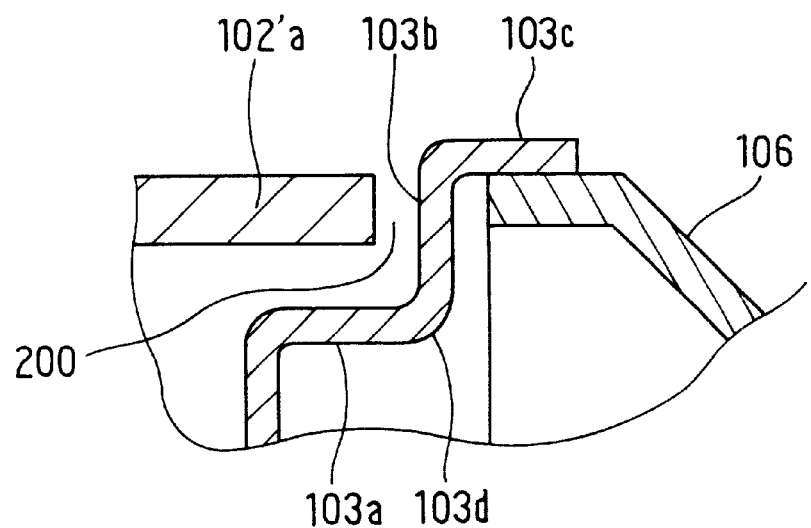
FIG. 8 is an enlarged cross sectional view similar to FIG. 6 of the EGR gas heat exchanger in the first embodiment.

Similar to the above, in the tank 102 which has two flat plates 102a and 102b fitted with each other to have two connecting portions 102d shown in FIG. 4, a portion where only one plate 102a (102b) faces the flat portion 103b of the core plate 103 is formed at each root portion of the step 102c as understood from FIGS. 4, 6 and 8. In this circumstance, when the tip portion of the plate 102'b (102'a) is formed to be flat as shown in FIG. 7, due to the same reason described above, i.e., due to the rounded folded portion 103d, the plate 102'a (102'b) also may not contact the flat portion 103b of the core plate 103 at the portion where the only one plate 102'a(102'b) faces the flat portion 103b of the core plate 103 since the tip portion of the plate 102'b (102'a) shown in FIG. 7 cannot contact the flat portion 103b of the core plate 103. In this case, the tank 102 may not be sealed by the core plate 103 at the portion where the only one plate 102'a (102'b) faces the flat portion 103b of the core plate 103 as shown in FIG. 8.

Therefore, when the tip portion of the plate 102b (102a) is formed to have the tapered portion 120 as shown in FIG. 5, this results in the tip portion of the plate 102a (102b) contacting the flat portion 103b of the core plate 103 to seal the tank 102 at the portion where only one plate 102a (102b) faces the flat portion 103b of the core plate 103 as shown in FIG. 6.

The tip portion of the plate 102a should be tapered at one of two connecting portions 102d shown in FIG. 4 where the plate 102a contacts the first wall 103a of the core plate 103 while the plate 102b overlaps the plate 102a. Also, the tip portion of the plate 102b should be tapered at the other of two connecting portions 102d shown in FIG. 4 where the plate 102b contacts the first wall 103a of the core plate 103 while the plate 102a overlaps the plate 102b. Therefore, both of plates 102a and 102b are tapered at the tip portions thereof as shown in FIGS. 5 and 6.

As described above, by forming the tapered portions 120 at the tip portion of respective plates 102a and 102b, the core plates 103 can be securely soldered to the tank 102, thereby preventing the cooling water from leaking from the tank 102 through the connecting portion between the tank 102 and core plates 103.

In the above-described embodiment, although the tank is formed by fitting and soldering two plates, and the tube is formed also by fitting and soldering two plates, the tank and tube are not limited to being formed using that process. For example, welded pipe or tube can be used to form the tank or the tube. Also, the shapes of the tank and tube is not limited to those of this embodiment. Moreover, the number of laminated tubes, row of the laminated tubes are not limited to those of this embodiment. Furthermore, a louver may be provided in each tube.

While the present invention has been shown and described with reference to the foregoing preferred embodiment, it will be apparent to those skilled in the art that changes in form and detail may be therein without departing from the scope of the invention as defined in the appended claims.

What is claimed is:

1. An exhaust gas heat exchanger comprising:
   a plurality of exhaust gas tubes through which exhaust gas generated by combustion flows, wherein the plurality of exhaust gas passages are laminated so as to be disposed substantially in parallel to each other;
   a tank containing the plurality of exhaust gas tubes and forming a water passage therein through which cooling water flows to exchange heat with the exhaust gas passing through the plurality of exhaust gas tubes;
   a cooling water inlet pipe disposed on the tank through which the cooling water flows into the tank;
   a cooling water outlet pipe disposed on the tank through which the cooling water is exhausted from the tank;

inlet and outlet bonnets communicating with an upstream side end portion and downstream side end portion of the plurality of exhaust gas tubes, respectively; and inlet side and outlet side core plates isolating the water passage of the tank from the inlet and outlet bonnets, respectively, wherein a peripheral portion of the inlet side core plate is folded toward the inlet bonnet to which the inlet side core plates plate is; and the inlet side core plate is folded at the peripheral portion thereof to form a crank shape having a first wall to be connected to the inner wall of the tank, a flat portion contiguous to the first wall and a second wall contiguous to the flat portion that is connected to the inlet bonnet.

2. An exhaust gas heat exchanger according to claim 1, wherein the inlet side core plate is connected to an inner wall of the tank.

3. An exhaust gas heat exchanger according to claim 1 wherein a folded portion is formed between the first wall and the flat portion to have a round shape and a tip portion of the tank contacts the flat portion of the inlet side core plate, wherein the tip portion of the tank has a tapered portion so that the tip portion is spaced form the folded portion when contacting the flat portion.

4. An exhaust gas heat exchanger according to claim 3, wherein the tank is formed with a pair of plates fitting with each other to have two connecting portions, wherein a step is formed in one of the plates that overlaps the other of the plates.

5. An exhaust gas heat exchanger comprising:

a plurality of exhaust gas tubes through which exhaust gas generated by combustion flows, wherein the plurality of exhaust gas passages are laminated so as to be disposed substantially in parallel to each other;

a tank containing the plurality of exhaust gas tubes and forming a water passage therein through which cooling water flows to exchange heat with the exhaust gas passing through the plurality of exhaust gas tubes;

a cooling water inlet pipe disposed on the tank through which the cooling water flows into the tank;

a cooling water outlet pipe disposed on the tank through which the cooling water is exhausted from the tank;

inlet and outlet bonnets communicating with an upstream side end portion and downstream side end portion of the plurality of exhaust gas tubes, respectively; and inlet side and outlet side core plates isolating the water passage of the tank from the inlet and outlet bonnets, respectively, wherein at least one of the cooling water inlet pipe and the cooling water outlet pipe is disposed on the tank so that a distance from a close one of the inlet side and outlet side core plates to said at least one of the cooling water inlet pipe and the cooling water outlet pip is equal to or less than a diameter of said at least one of the cooling water inlet pipe and the cooling water outlet pipe.

6. An exhaust gas heat exchanger according to claim 5, wherein the at least one of the cooling water inlet pipe and the cooling water outlet pipe is disposed on the tank so that a distance from the close one of the inlet side and outlet side core plates to said at least one of the cooling water inlet pipe and the cooling water outlet pip is substantially equal to a radius of said at least one of the cooling water inlet pipe and the cooling water outlet pipe.

* * * * *